UNITED STATES PATENT OFFICE.

FERNAND BRUNSCHWIG, OF BROOKLYN, NEW YORK.

PROCESS OF MANUFACTURING PHOSPHORIC ACID.

1,083,429.  Specification of Letters Patent.  Patented Jan. 6, 1914.

No Drawing.  Application filed November 23, 1912. Serial No. 733,088.

*To all whom it may concern:*

Be it known that I, FERNAND BRUNSCHWIG, a citizen of the United States, residing at Brooklyn, in the county of Kings and the State of New York, have invented a new and useful Process of Manufacturing Phosphoric Acid, of which the following is a specification.

One object of this invention is the production of pure phosphoric acid of a quality suitable for the manufacture of monocalcic salts thereof such as are used in baking powders.

Another object of this invention is the utilization as a source of phosphorus, for use in the production of pure phosphoric acid, of a material which though readily obtained, contains such impurities as prohibits its use in the hitherto known commercial processes of producing pure phosphoric acid.

More particularly the invention contemplates the production of pure phosphoric acid from phosphate rock although it is equally applicable to the production of such acid from other sources of phosphorus.

Prior to this invention the production of pure phosphoric acid from phosphate rock has not been successful owing to the presence of calcium fluorid and like substances in the rock. The elimination of these substances by the hitherto known processes rendered the operation too costly for commercial application in the production of baking powders.

In one form of my invention, I comminute phosphate rock and agitate it, unheated, with from the theoretical amount to twenty per cent. less of dilute sulfuric acid than is required to convert the calcium phosphate contained in the rock to phosphoric acid according to the equation

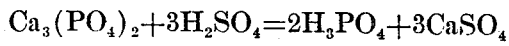

$$Ca_3(PO_4)_2 + 3H_2SO_4 = 2H_3PO_4 + 3CaSO_4$$

In other words, the calcium phosphate is in excess. When this reaction has been carried to a certain point, certain substances in the comminuted rock commence to go into solution apparently by the dissolving power of the phosphoric acid. When the reaction of the sulfuric acid has been carried to the point where this secondary reaction is imminent, the agitation is discontinued allowing the insoluble portion of the mixture to settle, thus stopping the reaction. The liquid is then decanted. This liquid contains the phosphoric acid and organic impurities; the calcium fluorid, calcium sulfate, etc., being left behind. The liquid is now heated with sulfuric acid, then mixed with a quantity of spent sugar refinery bone black whose calcium phosphate content is sufficient to neutralize the remaining sulfuric acid or a small excess. For this bone black there may be substituted pure calcium phosphate or calcium phosphate whose impurities do not go into solution when subjected to the remaining sulfuric acid. While this neutralization is being accomplished the liquid is heated until clear, then the liquid is filtered off from the precipitate; the precipitate being well washed with weak phosphoric acid, saved from former operations and then with water to obtain all the phosphoric acid. Thus the organic impurities are eliminated leaving nothing but water and pure phosphoric acid. The liquid may be concentrated and used as the acid in making the monocalcic phosphate used in baking powder, or of course, it may be used for any other purpose. Baking powders in which this acid is used will not derive any impurities from the acid on which a charge of adulteration under the Federal pure food law could be based. Something which was not possible when phosphate used was derived from phosphate rock by the hitherto known commercial means. It is apparent that the bone black used in this process could be fresh or any calcium phosphate-containing substance of like properties could be substituted, provided it did not contain deleterious bodies which would appear in the filtrate.

Having thus described my invention, I claim:

1. The process of producing phosphoric acid comprising the step of subjecting material containing calcium phosphate to the action of sulfuric acid the phosphate being from 0+% to 20% in excess.

2. In the production of phosphoric acid from material containing calcium phosphate first treating the material with sulfuric acid, then stopping the reaction before impurities go into solution.

3. In the production of phosphoric acid from material containing calcium phosphate first treating the material with less sulfuric acid than is required to combine with the calcium of the phosphate, then stopping the reaction before impurities go into solution.

4. In the production of phosphoric acid from material containing calcium phosphate first treating with an acid stronger than phosphoric, then stopping the reaction before impurities go into solution.

5. In the production of phosphoric acid from comminuted material containing calcium phosphate first treating with an acid stronger than phosphoric in the presence of sufficient solvent liquid to render the mass fluid while in the state of agitation, then stopping the reaction before impurities go into solution by allowing the comminuted particles to settle.

6. In the production of phosphoric acid from material containing calcium phosphate, first treating the material with an acid stronger than phosphoric the phosphate being in excess, then stopping the reaction before impurities go into solution.

7. In the production of phosphoric acid from solid material containing calcium phosphate, first treating the material in the presence of sufficient solvent with an acid stronger than phosphoric and with the phosphate in excess, then stopping the reaction before impurities go into solution, then separating the dissolved phosphate from the solid.

8. In the production of phosphoric acid from solid material containing calcium phosphate, first treating with sulfuric acid in the presence of sufficient solvent and with the phosphate in excess, then stopping the reaction before impurities go into solution, then separating the dissolved phosphate from the solid.

9. In the production of phosphoric acid from solid material containing calcium phosphate first treating with acid stronger than phosphoric in the presence of sufficient solvent liquid and with the phosphate in excess, then stopping the reaction before impurities go into solution, then separating the liquid from the solids, then treating the liquid with additional acid, then neutralizing the additional acid with solid material containing calcium phosphate which does not introduce impurities into the liquid, and then separating the liquid and solid.

10. In the production of phosphoric acid from solid material containing calcium phosphate first treating with sulfuric acid and sufficient solvent liquid, the calcium phosphate being in excess, then stopping the reaction before impurities go into solution, then separating the liquid from the solid, then treating the liquid with additional sulfuric acid, then neutralizing the additional acid with solid material containing calcium phosphate which does not introduce impurities into the liquid and then separating the liquid and solid.

11. In the production of phosphoric acid from solid material containing calcium phosphate first treating with acid stronger than phosphoric in the presence of sufficient solvent liquid, the phosphate being in excess, then stopping the reaction before impurities go into solution, then separating the liquid from the solid, then treating the liquid with additional acid, then neutralizing the additional acid with bone-black and then separating the liquid and solid.

12. In the production of phosphoric acid from solid material containing calcium phosphate first treating with liquid sulfuric acid, and sufficient solvent liquid, the phosphate being in excess, then stopping the reaction before impurities go into solution, then separating the liquid from the solid, then treating the liquid with additional sulfuric acid, then neutralizing the remaining additional acid with bone-black and then separating the liquid and solid.

13. In the production of phosphoric acid treating impure phosphoric acid liquid with stronger acid then neutralizing the stronger acid with solid material containing calcium phosphate and which does not introduce into the liquid impurities, then separating the solid and liquid.

14. In the production of phosphoric acid treating impure phosphoric acid liquid with sulfuric acid then neutralizing the sulfuric acid with solid material containing calcium phosphate and which does not introduce impurities into the liquid, then separating the solid and liquid.

15. In the production of phosphoric acid treating impure phosphoric acid liquid with stronger acid then neutralizing the stronger acid with solid material containing calcium phosphate but which does not introduce impurities into the solution, both reactions taking place in the presence of heat.

16. In the production of phosphoric acid treating impure phosphoric acid with a stronger acid then neutralizing the stronger acid with material which contains a phosphate and which does not introduce impurities into the mass.

In testimony whereof, I hereby affix my signature in the presence of two witnesses.

FERNAND BRUNSCHWIG.

Witnesses:
JOHN H. THODE,
JOHN B. MULLER.